May 5, 1959    J. W. MacFARLAND, JR    2,885,039
LOCKING DEVICE
Filed March 9, 1955    2 Sheets-Sheet 1
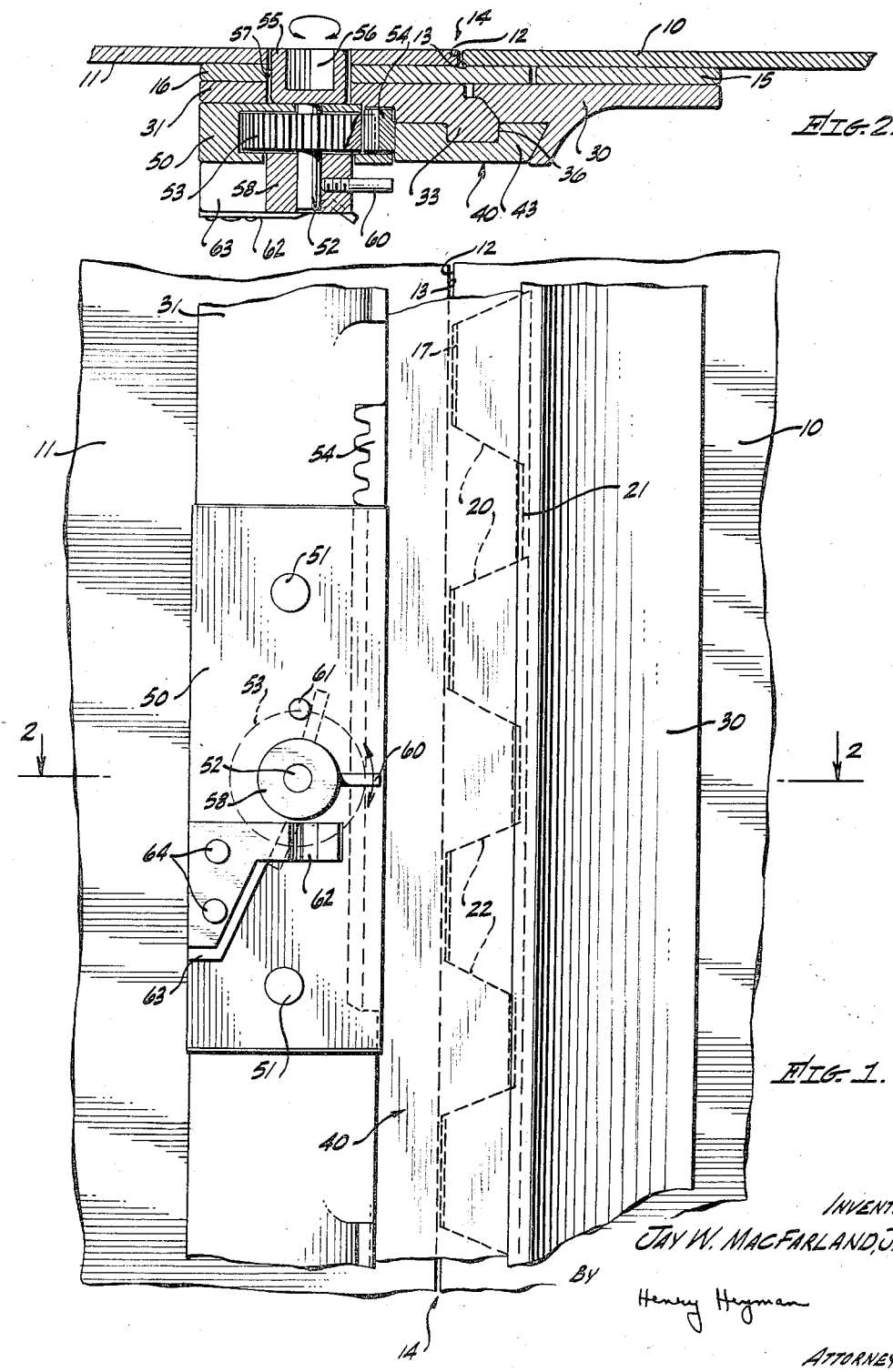

May 5, 1959     J. W. MacFARLAND, JR     2,885,039
LOCKING DEVICE
Filed March 9, 1955     2 Sheets-Sheet 2
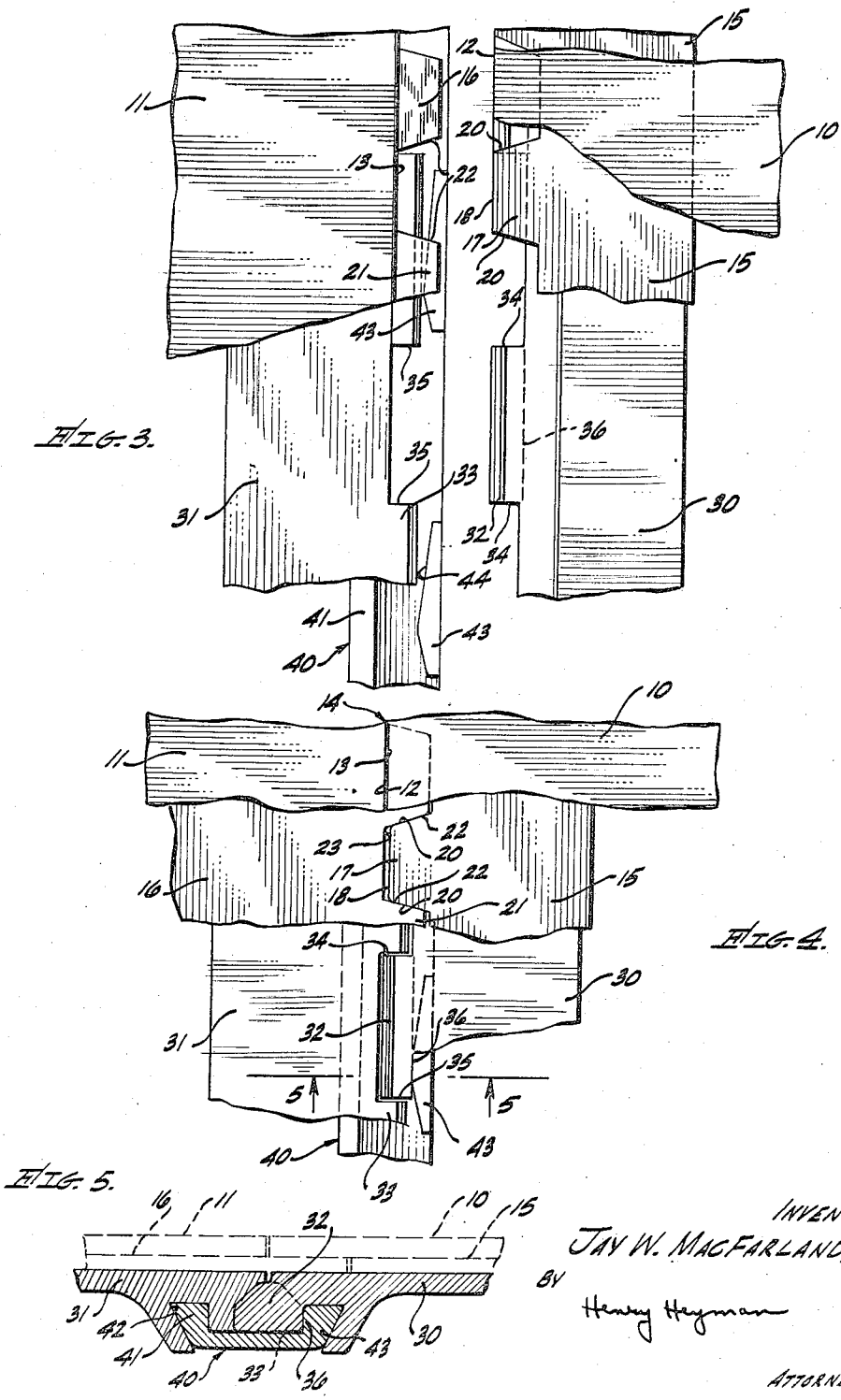

United States Patent Office 2,885,039
Patented May 5, 1959

2,885,039
LOCKING DEVICE

Jay W. MacFarland, Jr., Santa Monica, Calif., assignor to Hughes Aircraft Company, a corporation of Delaware Application March 9, 1955, Serial No. 493,499

4 Claims. (Cl. 189—36)

The present invention relates generally to a locking device and relates more particularly to a locking device adapted for use in conjunction with adjacently disposed sheets of material.

In releasable joining of sheets of material such as, for example, sheet metal, plastic, fibre-board and the like, it has been the customary practice to employ a plurality of screws, or other types of rotatable fasteners, together with fixed nut, spring clamp or detent arrangements. However, in instances where the sheets of material are subjected to longitudinal shearing stresses, unless such prior fastening arrangements were positioned at close intervals along adjacently disposed edges of the sheets, these prior fastening devices failed to withstand the shearing forces. Additionally, considerable time was necessary to accomplish installation of fixed nuts and the like, and further time consuming frequent assembly and disassembly have resulted in considerable damage to threads, thus necessitating repair and/or replacement thereof. Furthermore, in order that adequate strength and resistance to shearing action may be maintained immediately adjacent to or at the seam line between the sheets of material, it was necessary that prior fastening devices be placed as close to the edges of the sheets as possible. However, such placement of screws or other rotary type fastening devices was not always possible in areas close to the edges of the sheets due to the possibility of fracture through such edges.

In certain types of installations such as, for example, inspection openings or panel installations in aircraft, it is desirable, for outer surface smoothness, that edge fastening arrangements for such panels be devoid of any protruding fastening heads that would cause turbulence of air flow thereover.

Accordingly, it is one important object of the present invention to provide a locking device for adjacently disposed sheets of material.

It is another object of the present invention to provide a locking device for adjacently disposed sheets of material wherein means are provided, immediately adjacent a seam between such sheets, for withstanding shear loading in this area.

A further important object of the invention is to provide a novel strike and latch mechanism for use in conjunction with a locking device for adjacently disposed sheets of material.

A still further object of the present invention is to provide an interengaging wedge type locking device for adjacently disposed sheets of material wherein components thereof are relatively simple in construction, easy to manufacture and install and effective and efficient in operation.

Other and further important objects of the present invention will become apparent from the disclosures in the following detailed specification, appended claims and accompanying drawings, wherein:

Fig. 1 is a bottom plan view of the present locking device together with the lock operating arrangement utilized therewith;

Fig. 2 is a transverse sectional view of the locking device and operating mechanism, as taken tubstantially as indicated by line 2—2, Fig. 1;

Fig. 3 is a top plan view, on a reduced scale, of the present locking device shown prior to interengagement and latching thereof;

Fig. 4 is a top plan view similar to Fig. 3 showing the locking device in engaged and latched position; and Fig. 5 is an enlarged transverse sectional view through a portion of the strike and latch mechanism, as taken substantially as indicated by line 5—5, Fig. 4.

With reference to the drawings, the locking device of the present invention is adapted for use in conjunction with adjacently disposed sheets of material indicated generally at 10 and 11. The sheets 10 and 11 have opposed edges 12 and 13, respectively, that are adapted to be brought into close approximation one with the other to form a seam 14.

A pair of longitudinally extending strips of sheet material 15 and 16 are attached to the under-surface of the sheets 10 and 11, respectively. The strip 15 is provided with trapezoidal shape wedges 17, the outer ends 18 of which are in approximate alignment with edge 12 of the sheet 10. The wedges 17 have generally longitudinally directed edges 20. The strip 16 is provided with trapezoidal shape wedges 21 that are disposed in complementary interengageable relationship to the wedges 17. The wedges 21, formed on the sheet 16, extend beyond the edge 13 of the sheet 11 and are provided with generally longitudinally directed edges 22. The longitudinally directed edges 20 and 22, on the wedges 17 and 21 respectively, are adapted for interengaging contact with each other, the construction being such that the edges 18 of the wedges 17 will be maintained in spaced relationship to an interrupted edge 23 of the strip 16. Thus, longitudinal shearing stresses with respect to the sheets 10 and 11 and strips 15 and 16 will be carried through the abutting edges 20 and 22 of the wedges 17 and 21.

The strips 15 and 16 may be attached to the sheets 10 and 11 respectively in any desired manner such as, for example, by cementing or bonding thereto, spot welding or flush riveting, as may be desired for the particular installational situation and requirements of the structure.

Additionally, it is important in constructing the wedges 17 and 21 that the edges thereof be maintained at close tolerances. Accordingly, it has been found that these structures may be cut as by shearing in order to maintain the required tolerances and insure right angle configurations of the edges relative to the surfaces of the wedges.

A pair of longitudinal extending strike carrying members 30 and 31 are disposed on a lower surface of the strips 15 and 16 and secured thereto by any suitable means hereinbefore discussed. The strike carrying members 30 and 31 may be formed as by extrusion thereof, with these members having formed therefrom a plurality of strikes 32 and 33, respectively. The strikes 32 and 33 are arranged in complementary interengageable relationship with respect thereto and with respect to the members 30 and 31. The strikes 32 have ends 34 that are adapted for substantial alignment, lateral interengagement and longitudinal abutment with ends 35 of the strikes 33. As shown primarily in Fig. 5, the strikes 32 have longitudinally extending latch engaging surfaces 36, the purpose of which will be later described.

An elongated locking bar 40 is provided with a longitudinally extending guide portion 41 along one edge thereof, that is adapted for slidable reception in a way 42 formed on the underside of the member 31. The locking bar 40 extends laterally beyond the outer edges of the strikes 33 and has formed thereon a plurality of spaced latch portions 43, each of which is provided with wedge shaped latching surfaces 44. Upon interengagement of the wedges 17 and 21 and strikes 32 and 33, the locking bar 40 is adapted for longitudinal movement whereby the latching surfaces 44 of the latch portions 43 will engage the edges 36 of the strikes 32, to urge the strikes 32 into longitudinal alignment with the strikes 33 and simultaneously to move the longitudinally directed edges 20 and 22, of the wedges 17 and 21 respectively, into tight engagement with each other in the manner shown in Fig. 4. This tight engagement is insured by slight lateral spacing of the strikes of each of the members 30 and 31 with the adjacent edges of these members.

In order that the locking bar 40 may be moved longitudinally, with access thereto from the exterior surface of the sheets 10 and 11, an operating structure housing 50 is attached to the lower side of the strike carrying member 31 by means of rivets 51, for example. A shaft 52 is rotatably journalled in the housing 50 and has affixed thereto, in the central area thereof, a gear 53. The gear 53 is adapted for cooperation with a rack 54 that is disposed on and carried by one lateral edge of the locking bar 40. The outer end of the shaft 52 is fitted with a head portion 55 having a socket recess 56. The head portion 55 is disposed in an opening 57 provided through the sheet 11, strip 16 and member 31. The inner end of the shaft 52 is fitted with a collar 58 that is retained thereon by means of a threaded pin 60. Limited longitudinal movement of the locking bar 40 is controlled by limiting rotation of the shaft 52. As shown primarily in Fig. 1, the pin 60 is adapted for rotation with the shaft 52 and collar 58 between limits established by a stop pin 61 and a spring detent member 62. The detent member 62 is retained on a boss 63 by means of rivets 64, the boss 63 being formed inwardly from the inner surface of the housing 50. It may thus be seen that a key or the like may be inserted in the socket opening 56 of the head 55, thereby to permit rotation of the shaft 52 and gear 53 to effect longitudinal movement of the rack 54 and locking bar 40. As shown in Fig. 3, the unlatched position of the locking bar 40 disposes the latch portions 43 laterally adjacent the strikes 33. Upon movement of the locking bar 40, as hereinbefore described, the latch portions 43 will be moved to the latched position shown in Fig. 4, for the purpose discussed hereinbefore.

It may thus be seen that any tendency for the edges 12 and 13 of the sheets 10 and 11 to move relative to each other, either laterally or longitudinally, will be restricted by means of the latch and strike arrangement and the wedges 17 and 21, thus to provide a rigid connection between these sheets of material. It may also be seen that the sheets of material may be joined as by mere unrestricted lateral engagement thereof and longitudinal movement of the locking bar 40. The particular locked arrangement, thus obtained with the device of the present invention, permits distribution of stresses about the edges of the sheets 10 and 11, thus to maintain these edges in fixed relationship after closing of the lock arrangement. Inadvertent movement of the locking bar 40, as by vibration or the like, is prevented by engagement of the spring detent 62 with the pin 60.

Furthermore, the locking arrangement of the present invention lends itself to use in installational situations requiring slight bending of the adjacently disposed sheets of material in the plane of the sheets. Thus, the present latching device may be used releasably to join contoured sheets of material.

Having thus described the invention and the present embodiment thereof, it is desired to emphasize the fact that many modifications may be resorted to in a manner limited only by a just interpretation of the following claims.

What is claimed is:

1. A locking device for adjacently disposed sheets of material comprising strips secured along the undersurface of the opposed edges of said sheets, said strips having spaced interdigitating projections interfitting with each other, strike members secured to the undersurface of each of said strips and having a plurality of spaced interdigitating strikes projecting from the edges thereof and interfitting with each other, a shoulder along the undersurface of each of said strikes, said shoulders being in alignment, and a longitudinally slidable locking bar carried by one of said strike members in sliding contact with said shoulders thereof and provided with spaced corresponding latching wedges engaging said shoulders of the other strike member for firmly holding said sheets in assembled relationship.

2. A locking device for adjacently disposed sheets of material comprising strips secured along the undersurface of opposed edges of said sheets, said strips having spaced interdigitating tapered projections interfitting with each other, strike members secured to the undersurface of each of said strips and having a plurality of spaced interdigitating strikes projecting from the edges thereof and interfitting in end-to-end abutment, a shoulder along the undersurface of each of said strikes, said shoulders being in alignment, and a longitudinally slidable locking bar carried by one of said strike members in sliding contact with said shoulders thereof and provided with spaced corresponding latching wedges engaging said shoulders of the other strike member for maintaining said strikes in end-to-end abutment and simultaneously urging said tapered projections into tight engagement.

3. A locking device for adjacently disposed sheets of material comprising strips secured along the undersurface of opposed edges of said sheets, said strips having spaced interdigitating trapezoidal projections interfitting with each other, strike members secured to the undersurface of each of said strips and having a plurality of spaced interdigitating strikes projecting from the edges thereof and interfitting with each other, a shoulder along the undersurface of each of said strikes, said shoulders being in alignment, a longitudinally slidable locking bar carried by one of said strike members in sliding contact with said shoulders thereof and provided with spaced corresponding latching wedges engaging said shoulders of the other strike member for maintaining said strikes in end-to-end abutment and simultaneously urging said trapezoidal projections into tight engagement, a rack on said locking bar, a gear rotatably mounted in engagement with said rack, and means accessible through one of said sheets for rotating said gear.

4. A locking device for adjacently disposed sheets of material comprising strike members secured to the undersurface of opposed edges of said sheets and having a plurality of spaced interdigitating strikes projecting from the edges thereof and interfitting with each other, a shoulder projecting from the lower surface of each of said strikes, the shoulders along each edge being in alignment, a longitudinally slidable locking bar carried by one of said strike members in sliding contact with said shoulders thereof and provided with spaced corresponding latching wedges engaging said shoulder of the other strike member for firmly holding said sheets in assembled relationship.

References Cited in the file of this patent

UNITED STATES PATENTS

| Number | Name | Date |
|---|---|---|
| 559,557 | Wojton | May 5, 1896 |
| 1,063,318 | Bartels | June 3, 1913 |
| 1,080,825 | Fryer | Dec. 9, 1913 |
| 2,268,636 | Becker | Jan. 6, 1942 |
| 2,362,902 | Jansen | Nov. 14, 1944 |
| 2,392,835 | Conlon | Jan. 15, 1946 |
| 2,405,643 | Crot | Aug. 14, 1946 |
| 2,524,482 | Sheaffer | Oct. 3, 1950 |